United States Patent
Kumagai et al.

(10) Patent No.: US 6,536,800 B2
(45) Date of Patent: Mar. 25, 2003

(54) AIRBAG DEVICE

(75) Inventors: Masayoshi Kumagai, Tokyo (JP); Hideaki Okamoto, Tokyo (JP); Shingo Nakahara, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/776,637

(22) Filed: Feb. 6, 2001

(65) Prior Publication Data

US 2001/0033072 A1 Oct. 25, 2001

Related U.S. Application Data

(60) Provisional application No. 60/185,064, filed on Feb. 25, 2000.

(51) Int. Cl.$^7$ ............................ B60R 21/16; B60R 21/22
(52) U.S. Cl. ................................ 280/743.1; 280/730.1; 280/732
(58) Field of Search ........................ 280/743.1, 732, 280/728.1, 730.1

(56) References Cited

U.S. PATENT DOCUMENTS

| | | | | |
|---|---|---|---|---|
| 3,580,603 A | * | 5/1971 | Chute | 280/743.1 |
| 3,588,140 A | * | 6/1971 | Chute | 280/730.1 |
| 3,795,414 A | * | 3/1974 | Ventre et al. | 280/730.1 |
| 3,831,972 A | * | 8/1974 | Allgaier et al. | 280/730.1 |
| 3,929,350 A | * | 12/1975 | Pech | 280/729 |
| 5,022,675 A | * | 6/1991 | Zelenak, Jr. et al. | 280/743.1 |
| 5,129,675 A | * | 7/1992 | Wang | 280/743.1 |
| 5,160,164 A | * | 11/1992 | Fischer et al. | 280/743.1 |
| 5,253,892 A | * | 10/1993 | Satoh | 280/743.1 |
| 5,310,214 A | * | 5/1994 | Cuevas | 280/743.1 |
| 5,427,410 A | * | 6/1995 | Shiota et al. | 280/743.1 |
| 5,489,119 A | * | 2/1996 | Prescaro et al. | 280/730.1 |
| 5,520,413 A | * | 5/1996 | Mossi et al. | 280/743.1 |
| 5,613,698 A | * | 3/1997 | Patercsak et al. | 280/743.1 |
| 5,746,447 A | * | 5/1998 | Dyer et al. | 280/743.1 |
| 5,906,931 A | | 5/1999 | Weir et al. | 280/729 |
| 5,945,184 A | | 8/1999 | Nagata et al. | 428/35.2 |
| 6,022,046 A | | 2/2000 | Isomura et al. | 280/743.2 |
| 6,042,144 A | * | 3/2000 | Murakami et al. | 280/743.1 |
| 6,042,147 A | * | 3/2000 | Nishijima et al. | 280/743.1 |
| 6,089,599 A | * | 7/2000 | Schimmoller et al. | 280/743.1 |
| 6,302,433 B1 | | 10/2001 | Ellerbrok et al. | 280/729 |

FOREIGN PATENT DOCUMENTS

| | | |
|---|---|---|
| EP | 0 922 616 A2 | 6/1999 |
| JP | S49-23176 | 3/1974 |
| JP | 1-105505 | 4/1989 |
| JP | H04-56655 | 2/1992 |
| JP | 04-166453 | 6/1992 |

(List continued on next page.)

Primary Examiner—Paul N. Dickson
Assistant Examiner—Joselynn Y. Sliteris
(74) Attorney, Agent, or Firm—Foley & Lardner

(57) ABSTRACT

An airbag device including an airbag that provides more effective protection of an occupant. The airbag has an indentation located approximately in the center of a contact surface thereof. The indentation is formed in the shape of a recess or a valley to form the airbag into a heart-like shape. The area including the indentation is at least greater than an area where comes in contact with the face of an occupant. The deepest point of the dent (the farthest point from the occupant in the contact surface) is positioned below the jaw of the occupant. The contact surface extending from the deepest point of the dent to the upper projection top thereof overhangs toward the occupant to have an angle between 0° and 45° (preferably, between 15° and 25°) relative to the cervical vertebrae axis of the occupant.

4 Claims, 14 Drawing Sheets

FOREIGN PATENT DOCUMENTS

| | | | | |
|---|---|---|---|---|
| JP | 4283145 | 8/1992 | | |
| JP | 558243 | 3/1993 | | |
| JP | 5178146 | 7/1993 | | |
| JP | 05-213135 | 8/1993 | | |
| JP | 5270346 A | * 10/1993 | ........... | B60R/21/20 |
| JP | 6171447 | 6/1994 | | |
| JP | H06-191366 | 7/1994 | | |
| JP | 6219228 A | * 8/1994 | ........... | B60R/21/16 |
| JP | 6-298025 | 10/1994 | | |
| JP | 7069150 | 3/1995 | | |
| JP | H8-32511 | 2/1996 | | |
| JP | 9030352 | 4/1997 | | |
| JP | 9118186 | 5/1997 | | |
| JP | 9132097 | 5/1997 | | |
| JP | 9315246 | 12/1997 | | |
| JP | 10001006 | 1/1998 | | |
| JP | 10044914 | 2/1998 | | |
| JP | 10315892 | 2/1998 | | |
| JP | 10071911 | 3/1998 | | |
| JP | 10-119681 | 5/1998 | | |
| JP | 10-175501 | 6/1998 | | |
| JP | 10203280 | 8/1998 | | |
| JP | 10203281 | 8/1998 | | |
| JP | 10244902 | 9/1998 | | |
| JP | 11-005505 | 1/1999 | | |
| JP | 11115667 | 4/1999 | | |
| JP | 11321506 | 11/1999 | | |
| JP | 2000118341 | 4/2000 | | |
| JP | P2000-177521 | 6/2000 | | |
| JP | 2001030863 | 2/2001 | | |
| WO | WO 00/12359 | 3/2000 | | |
| WO | WO 00/15472 | 3/2000 | | |

* cited by examiner

AIRBAG DEVICE

CROSS REFERENCE TO RELATED APPLICATIONS

The present application claims priority to and the benefit of U.S. Provisional Patent Application Ser. No. 60/185,064 filed Feb. 25, 2000. The foregoing provisional application is incorporated by reference herein in its entirety.

BACKGROUND

The present invention relates to an airbag device in which an airbag is inflated to protect an occupant in the event of vehicle collision. More particularly, the present invention relates to an airbag device of which an airbag has an improved configuration accomplishing more effective protection of an occupant.

The following publications are generally related to airbag devices, however, none of the publications has a suggestion or disclosure of the same or similar device and structure proposed by the present invention. The publications are: Japanese Patent Publication No. H08-32511; Japanese Patent Publication No. S49-23176; Japanese Patent Unexamined Publication No. H04-56655; Japanese Patent Unexamined Publication No. H06-191366; Japanese Patent Unexamined Publication No. H06-171447; Japanese Patent Unexamined Publication No. H05-58243; Japanese Patent Unexamined Publication No. 2000-118341; and Japanese Patent Unexamined Publication No. H11-5505.

SUMMARY OF THE INVENTION

It is an object of the present invention to provide an airbag device of which an airbag has an improved configuration accomplishing more effective protection of an occupant.

In order to solve the above-described problems, an airbag device according to the first aspect of the present invention is an airbag device comprising an airbag which is normally housed in an upper portion of an instrument panel and is inflated/deployed toward the front of an occupant in the event of emergency, wherein the configuration in a side view of the airbag when fully deployed has the following three characteristics:

(1) the lower end of the airbag is positioned at least lower than the chest of the occupant;
(2) a dent or indentation is formed between an upper portion and a lower portion of the front face of the airbag so as to maintain the airbag in a heart-like configuration when the lower portion is pressed; and
(3) an area including the dent is at least greater than an area coming in contact with the face of the occupant.

According to this configuration, the lower portion of the airbag is pressed by at least a portion under the chest of the occupant so that pressure is supplied from the lower portion to the upper portion of the airbag so as to increase the inner pressure in the upper portion of the airbag. Therefore, the efficiency of absorbing energy is increased and the moving distance of the occupant until stops is reduced, thereby eliminating the requirement of setting the output of the inflator high and achieving more safe restraint of the occupant in the initial stage. The high efficiency of absorbing energy also allows the reduction in the volume of the airbag. Since the frontward movement of the occupant until the occupant makes contact with the airbag is increased by the dent, the occupant comes in contact with the airbag after an amount kinetic energy of the occupant is absorbed by a seat belt.

In the aforementioned airbag device, the dent may be formed in any shape like a recess or a valley in the airbag.

An airbag device according to the second aspect of the present invention comprises an airbag which is normally housed in an upper portion of an instrument panel and is inflated/deployed toward the front of an occupant in the event of emergency, wherein the front face of an upper half of the airbag overhangs toward the occupant to have an angle between 0° and 45° (preferably, between 15° and 25°) relative to the cervical vertebrae axis of the occupant when the head of the occupant just comes into contact with the airbag in the event of emergency.

Since the front face of the airbag overhangs toward the occupant as mentioned above, a portion corresponding to the mass point (gravitational centers) of the head of the occupant comes into contact with the front face of the airbag, thereby more efficiently restraining the head of the occupant in the initial stage.

An airbag device of the third aspect of the present invention comprises an airbag which is normally housed in an upper portion of an instrument panel and is inflated/deployed toward the front of an occupant in the event of emergency, wherein a dent is formed between an upper portion and a lower portion of the front face of the airbag, and the front face of the airbag overhangs toward the occupant in such a manner that an area of the front face extending from the deepest point of the dent to an upper projection top makes contact with portions corresponding to the mass points (gravitational centers) of the heads of occupants of different builds.

Since the front face of the airbag overhangs toward the occupant as mentioned above, the mass point of the head of the occupant can early restrained. Therefore, the efficiency of absorbing energy is increased, thereby more efficiently restraining the head of the occupant in the initial stage.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION OF THE INVENTION

Figure 1:
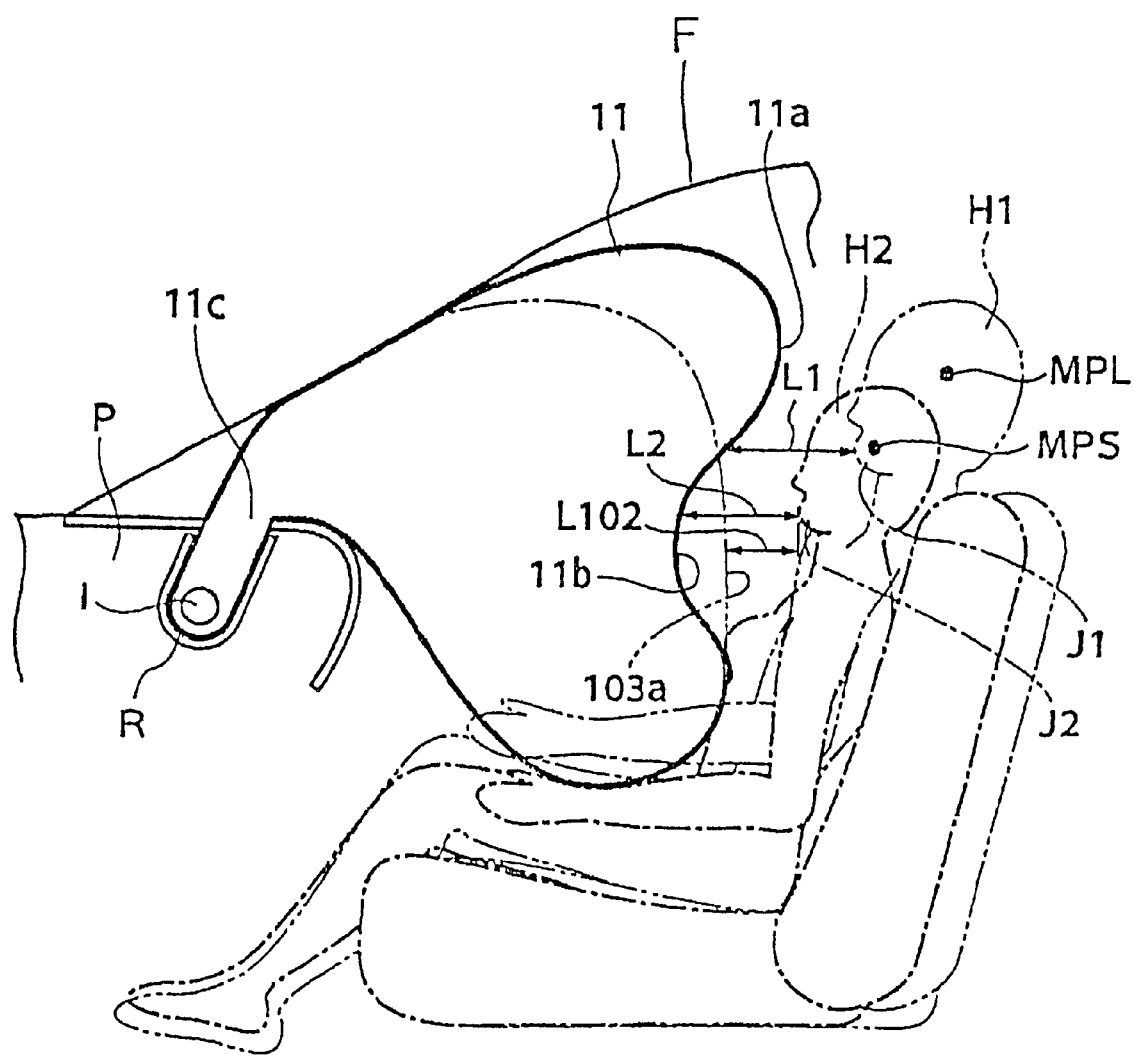
FIG. 1 is a schematic side view showing a front-passenger airbag device, in the fully deployed state, according to the present invention.

Brief description will now be made as regard to main functions of an airbag device according to a representative embodiment of the present invention. It should be noted that a portion of an airbag to be pressed by the occupant's chest or abdomen is called as a abdominal bag portion and a portion of the airbag to be pressed by the occupant's head is called as a head bag portion.

The occupant's chest or abdomen first presses the airbag so that the chest or abdomen is the first place which receives reaction from the airbag. Then, the occupant's head receives reaction. Even when the inner pressure of the airbag is increased, the heart-like configuration of the airbag is maintained.

According to this configuration, the abdominal bag portion is depressed by the abdomen or the chest of the occupant so as to increase the inner pressure of the airbag. Since the heart-like configuration is maintained, gas pressure is hard to leak out and the reaction of the abdominal bag portion is increased so that the efficiency of restraining the occupant's abdomen at the initial stage is increased. Since the airbag has a dent, the area where the dent is formed does not deform so much. Therefore, the head bag portion can be filled with gas without reducing the inner pressure. As a result of this, the inner pressure of the head bag portion is higher than that of a conventional airbag. Therefore, the efficiency of restraining the occupant's head is increased so as to shorten the stroke (moving distance) of the occupant's head. This allows the reduction in the output of an inflator or the reduction in the volume of the entire airbag.

The airbag is configured so as to have a slanted surface from the deepest position of the dent to an upper projection end of the head bag portion, wherein the slant surface makes contact with a position on the occupant's face corresponding to the point of gravitational center (mass point; MP) of the head. The MP position is located approximately between the eyebrows. Because the seated height depends on the occupant's build, the slanted surface is set so that the deepest position of the dent is positioned below the jaw of a person who has a low seated height and the upper projection end of the head bag portion is positioned above the position between the eyebrows of a person who has a high seated height, thereby coping with various persons. In detail, the slant surface overhangs to have an angle between 0° and 45° (preferably, between 15° and 25°) relative to the cervical vertebrae axis of the occupant when the head of the occupant just comes into contact with the airbag.

According to this configuration, the restraining force of the head bag portion is concentrated at the mass point (center of gravity) of the occupant's head, thereby most efficiently absorbing the kinetic energy of the occupant's head. There are a lot of cases where a small occupant who puts on a seat belt sits in a vehicle seat in the front-most position. When such an occupant plunges into the airbag in the event of emergency, the frontward movement of the occupant is allowed by the dent. In these situations, the stroke for the forward movement of the occupant is increased. After some kinetic energy is absorbed by the seat belt, some further kinetic energy can be absorbed by the airbag, thereby further effectively restraining the occupant.

Hereinafter, the present invention will be described with reference to attached drawings.

Though, in the following embodiments, description will be made as regard to an airbag device for protecting a front passenger (hereinafter, referred to as "front-passenger airbag device") which is of a type to be mounted on the top of a dashboard, the present invention can be applied to any airbag device other than the front-passenger airbag device.

FIG. 1 is a schematic side view showing a front-passenger airbag device, in the fully deployed state, according to an embodiment of the present invention.

The airbag device shown in FIG. 1 has a retainer R which is disposed at a position facing to a windshield F positioned above an instrument panel P of a vehicle. Arranged in the retainer R are an airbag 11 made of textile fabric and formed in an envelope shape, and an inflator I for supplying gas for deployment into the airbag 11. The airbag 11 is normally folded and accommodated in the retainer R. The volume of the airbag 11 is in a range from 110 to 132 liters when the airbag 11 is of a small size. The airbag 11 has a throttled open end (gas inlet) 11c formed at the root thereof. The open end 11c is connected to a space of the inflator I. On the right side (in the drawing) of the airbag 11 is a contact surface or front face 11a which can come in contact with the occupant.

The airbag 11 has an indentation or dent 11b formed around the center of the contact surface 11a. The dent 11b is like a recess or a valley in the airbag to form the airbag into a heart-like or heart shape, as described later. The area including the dent 11b (the entire area where the dent is formed) is greater than an area where comes in contact with the face of a small-sized occupant H2. The deepest point of the indentation or dent 11b (the farthest point from the occupant in the contact surface 11a) is positioned below the jaw J2 of the small-sized occupant H2.

FIG. 1 shows two occupants H1, H2 of different builds. The distance between the jaw J1 of the occupant Hi and the contact surface 11a of the deployed airbag 11 is indicated by L1 and the distance between the jaw J2 of the occupant H2 and the contact surface 11a of the deployed airbag 11 is indicated by L2. L1, L2 may be 100 mm or the like. For comparison, a contact surface 103a of a conventional airbag is also shown and the distance between the contact surface 103a and the jaw J2 of the occupant H2 is indicated by L102.

As shown in FIG. 1, in the airbag device according to this embodiment, the existence of the dent 11b can make the distance L2 between the occupant H2 and the contact surface 11a to a length not so different from the distance L1 between the occupant H1 and the contact surface 11a. Therefore, the occupant H2 comes in contact with the airbag 11 after a portion of the kinetic energy of the occupant is absorbed by the seat belt enough.

The mass points (points of gravitational center) of the heads of the occupants H1, H2 are represented by MPL, MPS, respectively, in FIG. 1. In the airbag device according to this embodiment, the front face of the bag overhangs toward the occupants H1, H2 in such a manner that an area of the front face 11a extending from the deepest point of the dent 11b and an upper projection top thereof makes contact with portions corresponding to the mass points MPL, MPS of the heads of the occupants H1, H2 of different builds. This configuration that the front face of the bag overhangs toward the occupant can achieve more safe restraint of the occupant in the initial stage.

Figure 2A:
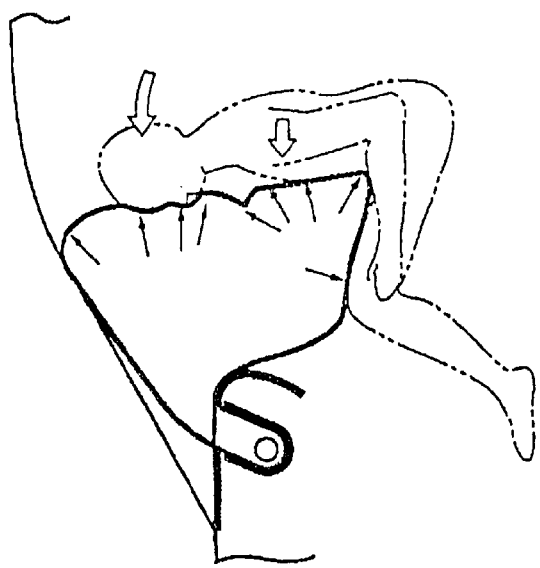
FIG. 2(A) is a schematic side view of the front-passenger airbag device according to the present invention in a situation where the occupant of the vehicle has begun to move forward.
Figure 2B:
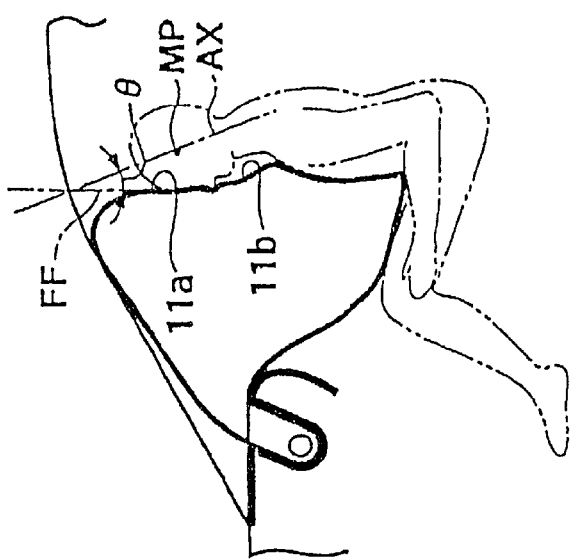
FIG. 2(B) is a schematic side view of the front-passenger airbag device according to the present invention in a situation where the face of the occupant just comes in contact with the airbag.
Figure 2C:
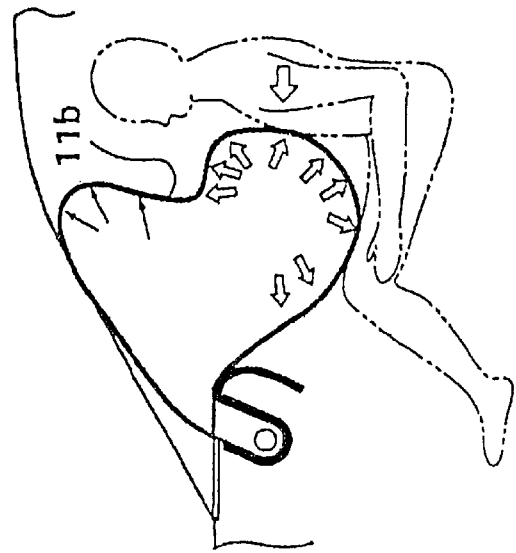
FIG. 2(C) is a schematic side view of the front-passenger airbag device according to the present invention in a situation where the occupant is restrained by the airbag.

Description will now be made as regard to the configurations and functions of the airbag device according to the embodiment during the absorbing action (during the forward movement of the occupant) with reference to FIGS. 2(A)–2 (C). FIGS. 2(A)–2(C) are schematic side views showing the configurations of the front-passenger airbag device according to the present invention during the absorbing action (during the forward movement of the occupant). FIG. 2(A) shows a state that the occupant starts to move forward, FIG. 2(B) shows a state that the face of the occupant just comes in contact with the airbag, and FIG. 2(C) shows a state that the occupant is restrained by the airbag.

As shown in FIG. 2(A), the abdomen or chest of the occupant first touches the airbag 11 when the occupant starts to move forward. Inside the airbag 11, blank arrows indicate reactive force (pressure). In this embodiment, the upward flow of the pressure is restricted because of the heart-like configuration, thereby securely restraining the occupant at the initial stage. For this purpose, the airbag 11 should be formed so that the heart-like configuration of the airbag is maintained even when the lower portion of the airbag is pressed.

FIG. 2(B) shows a state that the face of the occupant just comes in contact with the airbag. In FIG. 2(B), the deepest point of the dent 11b is positioned below the jaw of the occupant and the contact surface 11a extending from the deepest point of the dent 11b to the upper projection top thereof overhangs toward the occupant to have an angle of between 0° and 45° (preferably, between 15° and 25°) relative to the cervical vertebrae axis AX of the occupant when the head of the occupant just comes into contact with the airbag. That is, a point of intersection between a line FF formed by the aforementioned contact surface 11a and the cervical vertebrae axis AX of the occupant is positioned above the head of the occupant and the angle θ formed therebetween is from 0° to 45° (preferably, from 15° to 25°). This achieves the secure restraint of the point of gravitational center MP (about a position between eyebrows) of the occupant's head, thus most effectively absorbing the kinetic energy of the occupant's head.

FIG. 2(C) shows a state that the occupant is completely restrained by the airbag. As the occupant further moves forward from the state shown in FIG. 2(B), the occupant's abdomen presses the lower portion of the airbag 11 so that the lower portion of the airbag is compressed. As the heart-like configuration of the airbag is maintained even when the pressure inside the airbag is increased, there is little leak of gas pressure and thus the reactive force in the lower portion of the airbag is increased, thereby increasing the efficiency of restraining the occupant at the initial stage. The occupant's abdomen depresses the lower portion of the bag, but the heart-like configuration is maintained so that the gas pressure is effectively supplied to the upper portion of the airbag. As a result of this, the inner pressure of the upper portion of the airbag is increased, thus increasing the efficiency of absorbing the energy by the upper portion of the airbag. After that, the occupant's head is restrained by the upper portion of the airbag 11.

During this sequential restraining action, there is little leak of pressure and the efficiency of the airbag to absorb the energy of the occupant is increased, thus shortening the stroke of the head. The design of the present invention can eliminate the requirement of setting the output of the inflator I high and allows an airbag of a small volume to be employed. In addition, the occupant can come in contact with the airbag after kinetic energy is sufficiently absorbed by the seat belt.

Hereinafter, embodiments of an airbag according to the present invention will be described with reference to the attached drawings. The following embodiments or examples have been developed by using various methods to achieve the fact that the heart-like configuration is maintained even when the lower portion is depressed.

Figure 3A:
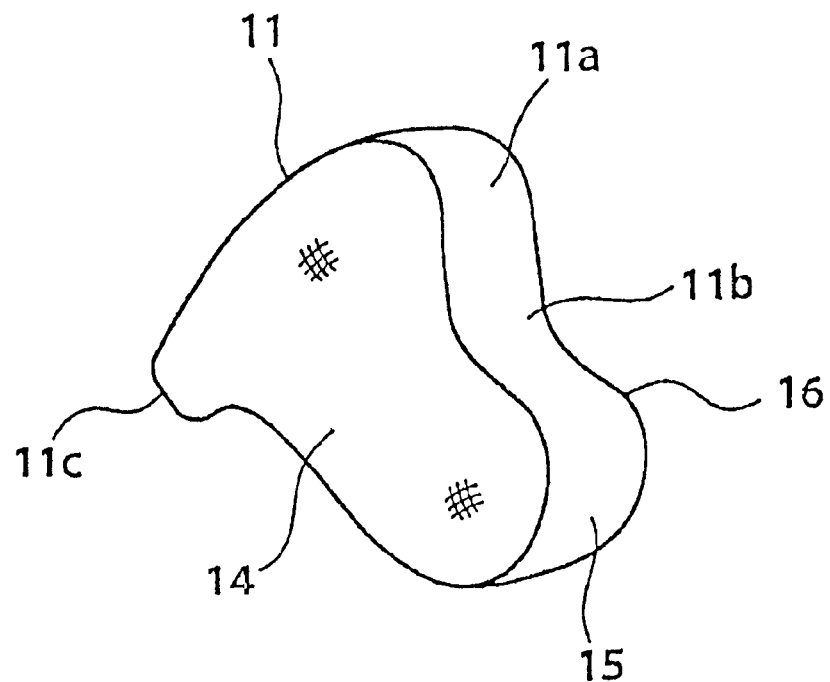
FIGS. 3(A) is a perspective view of an airbag according to the present invention in the deployed state.
Figure 3B:
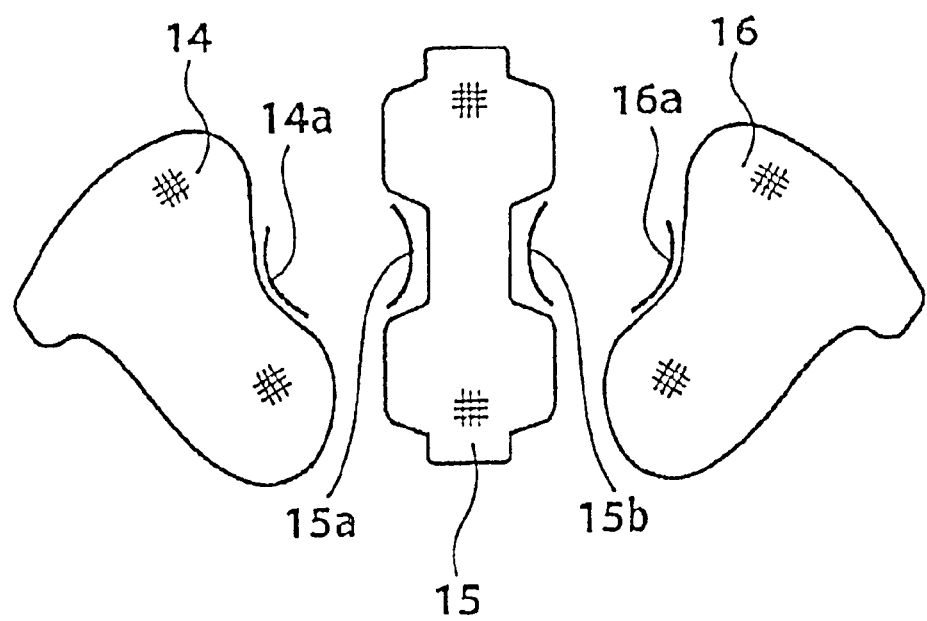
FIG. 3(B) is a plan view showing three pieces of panels that a part of the air bag of FIG. 3(A).

FIGS. 3(A), 3(B) are views that disclose an embodiment of an airbag according to the present invention. FIG. 3(A) is a perspective view of the airbag in the deployed state, and FIG. 3(B) is a plan view showing three separate panel that form the airbag. The airbag is made by connecting the three pieces of panel together.

In FIG. 3(A), an airbag 11 made by connecting three pieces of panels 14, 15, 16 is shown. The airbag 11 has a throttled open end 11c formed at the root thereof. The front face of the airbag 11 is a contact surface 11a which can come in contact with an occupant. The airbag is provided with a dent 11b formed around the middle of the contact surface 11a.

In FIG. 3(B), plan views of the panels 14, 15, 16 are shown. For forming the dent 11b, the panels 14, 15, 16 are formed with cutouts 14a, 15a, 15b, 16a, respectively. By connecting the panels along these cutouts, a three-dimensional recessed portion, i.e. the dent 11b can be formed. Various configurations of the airbag can be accomplished by changing the respective configurations of the three pieces of panels.

Figure 4:
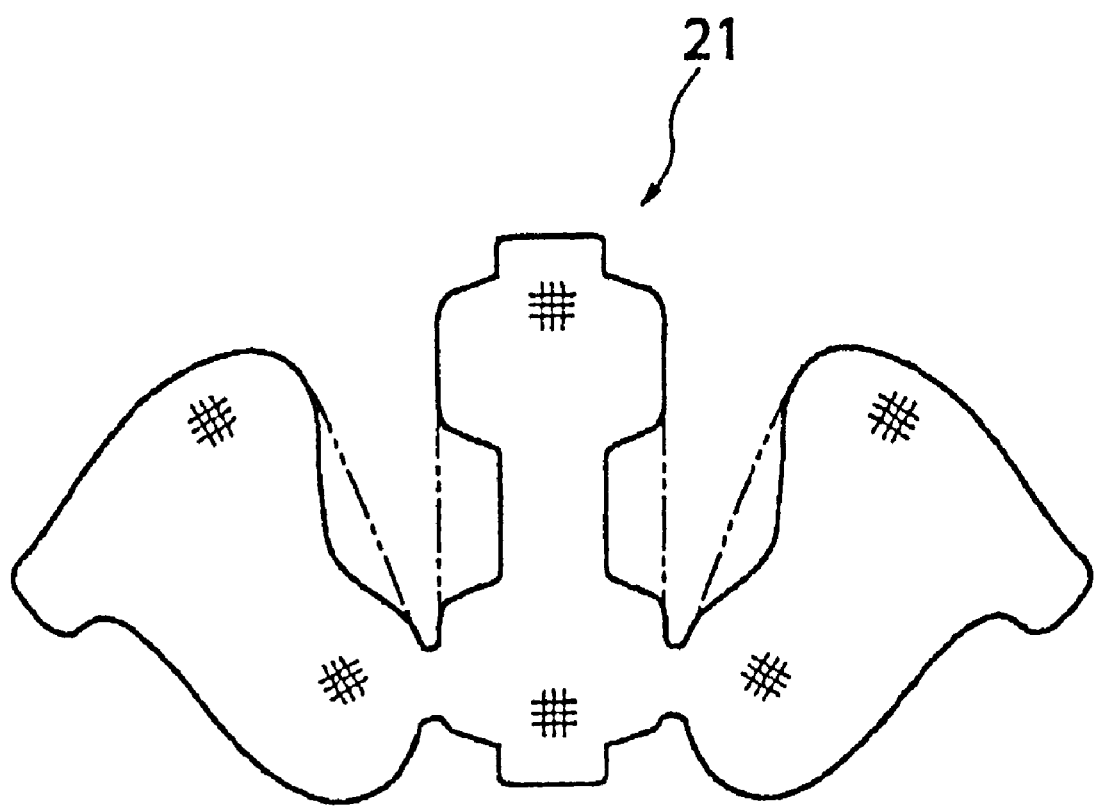
FIG. 4 is a view showing an airbag according to an example of the present invention.

FIG. 4 discloses another embodiment of an airbag according to the present invention, In this example, the airbag is made by connecting one piece of panel. In FIG. 4, a plan view of one piece of panel 21 is shown. The panel 21 is in a shape just like a shape that parts of the panels 14, 15, 16 shown in FIG. 3(B) are connected. The one piece panel configuration facilitates the manufacturing and assembly of the airbag.

Figure 5:
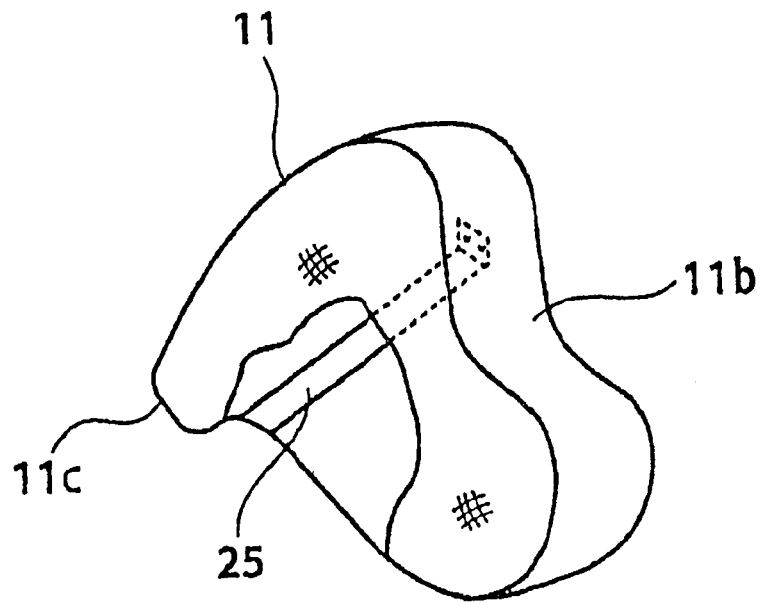
FIG. 5 is a view showing an airbag according to an example of the present invention.

FIG. 5 discloses an alternative embodiment of the present invention. As shown in FIG. 5, the airbag further includes a tether belt located at the dent of the airbag. In FIG. 5, an airbag 11 just like the airbag shown in FIG. 3(A) is shown. One end of a tether belt 25 is sewn to an inner surface near the dent 11b of the airbag 11. The other end of the tether belt 25 is sewn to an inner surface near the open end 11c. The expansion ratio of the tether belt 25 is lower than that of the airbag 11. The tether belt 25 may be a cord or ribbon. The addition of the tether belt 25 ensures to keep the heart shape of the airbag during the deployment of the airbag.

Figure 6:
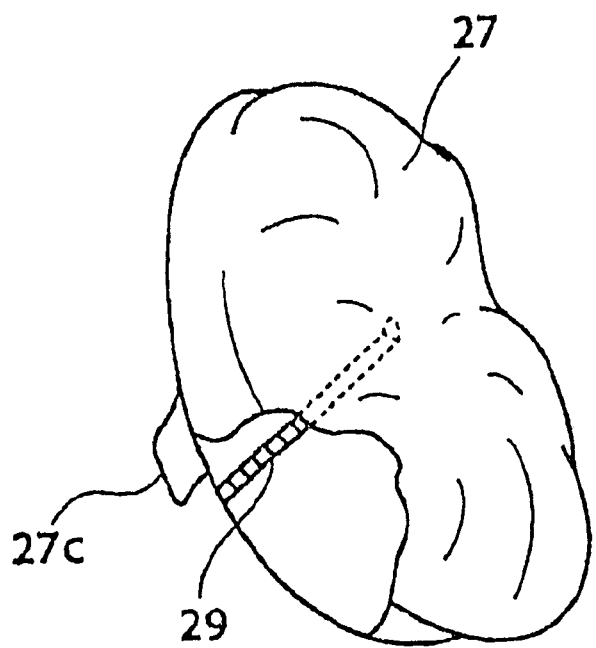
FIG. 6 is a view showing an airbag according to an example of the present invention.

FIG. 6 discloses still another embodiment of an airbag according to the present invention. As shown in FIG. 6, the airbag is similar to a conventional airbag but including a tether belt. In FIG. 6, a conventional airbag 27 without a dent portion is shown. One end of a tether belt 29 is sewn to an inner surface near the center of the airbag 27. The other end of the tether belt 29 is sewn to an inner surface near the open end 27c. The portion about the center is pulled by the tether belt 29 during the inflation of the airbag 27 so as to form a dent portion. Since this example can use a conventional airbag, the manufacturing is easy.

Figure 7:
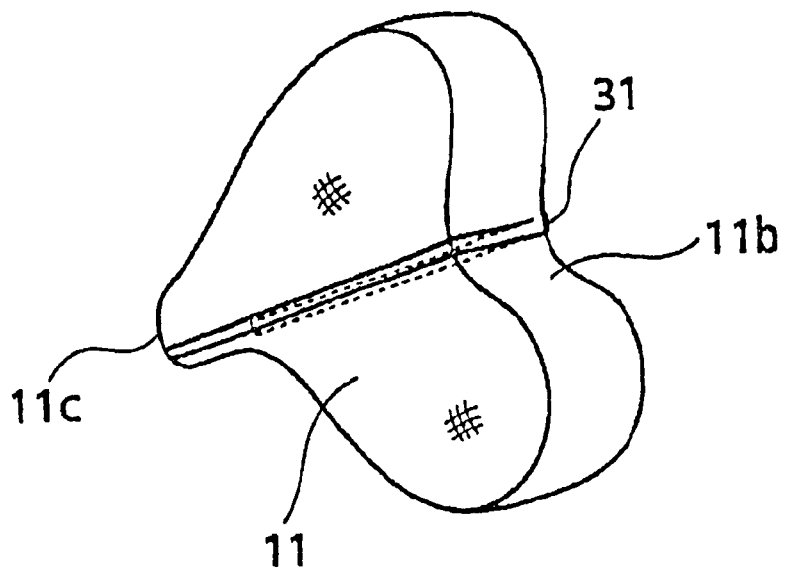
FIG. 7 is a view showing an airbag according to an example of the present invention.

FIG. 7 discloses yet another embodiment of an airbag according to the present invention. This example includes a band arranged around a portion of an airbag where a dent is formed. In FIG. 7, an airbag 11 just like the airbag as shown in FIG. 3(A) is shown. A band 31 is arranged around a periphery of the dent 11b of the airbag 11. Ends of the band 31 are sewn to portions near the open end 11c.

Figure 8:
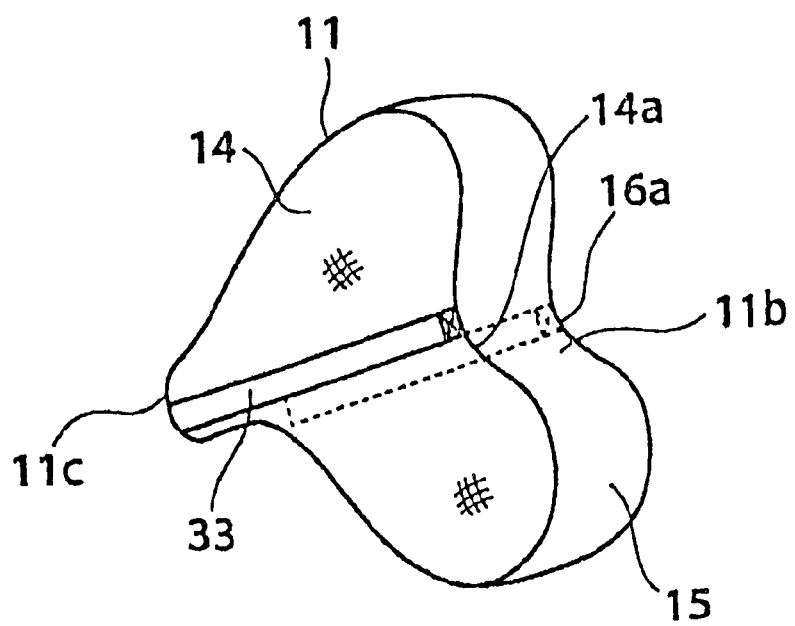
FIG. 8 is a view showing an airbag according to an example of the present invention.

FIG. 8 discloses is a further embodiment of an airbag according to the present invention. This example includes tether belts sewn to portions around a dent of an airbag. In FIG. 8, an airbag 11 just like the airbag composed of plural pieces of panels as shown in FIG. 3(B) is shown. As shown in FIG. 8, tether belts are sewn to portions near the cutouts 14a, 16a of the panels 14, 16, respectively. The illustration of the tether belt 33 on the panel 16 is shown by dotted line. Ends of the tether belts 33 are sewn to portions near the open end 11c.

Figure 9:
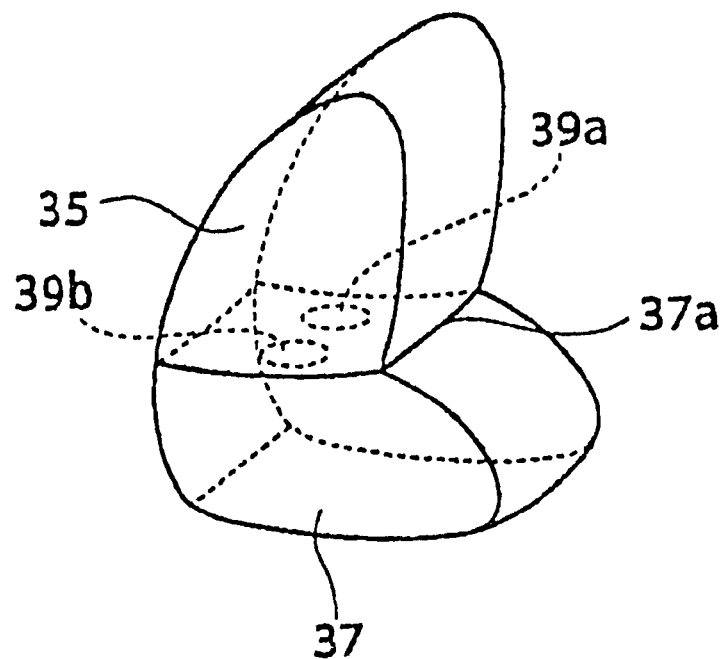
FIG. 9 is a view showing an airbag according to an example of the present invention.

FIG. 9 discloses another embodiment of an airbag according to the present invention. This example is a combination of two airbags. As shown in FIG. 9, a combined airbag composed of two airbags 35, 37 is shown. Two holes 39a, 39b are formed in a boundary between the airbags 35, 37 which are bonded together. These holes 39a, 39b allow the communication of gas. Front faces of the airbags 35, 37 corporate to form a dent 37a around the boundary therebetween.

Figure 10:
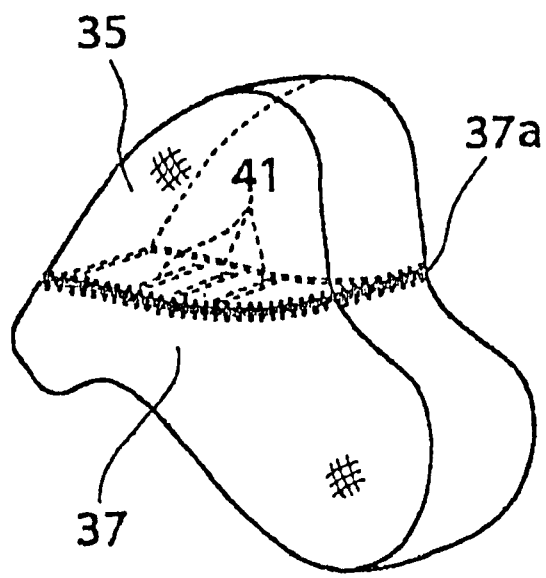
FIG. 10 is a view showing an airbag according to an example of the present invention.

FIG. 10 discloses a different embodiment of an airbag according to the present invention. This example is an another example of a combination of two airbags. In FIG. 10, a combined airbag composed of two airbags 35, 27 is shown. A plurality of slit-like openings 41 are formed in a boundary between the airbags 35, 37 which are bonded together. These openings 41 allow the communication of gas. It should be noted that the number of airbags to be combined, the configuration of the airbag, the number of openings, and the configuration of the opening are not limited thereto.

Figure 11:
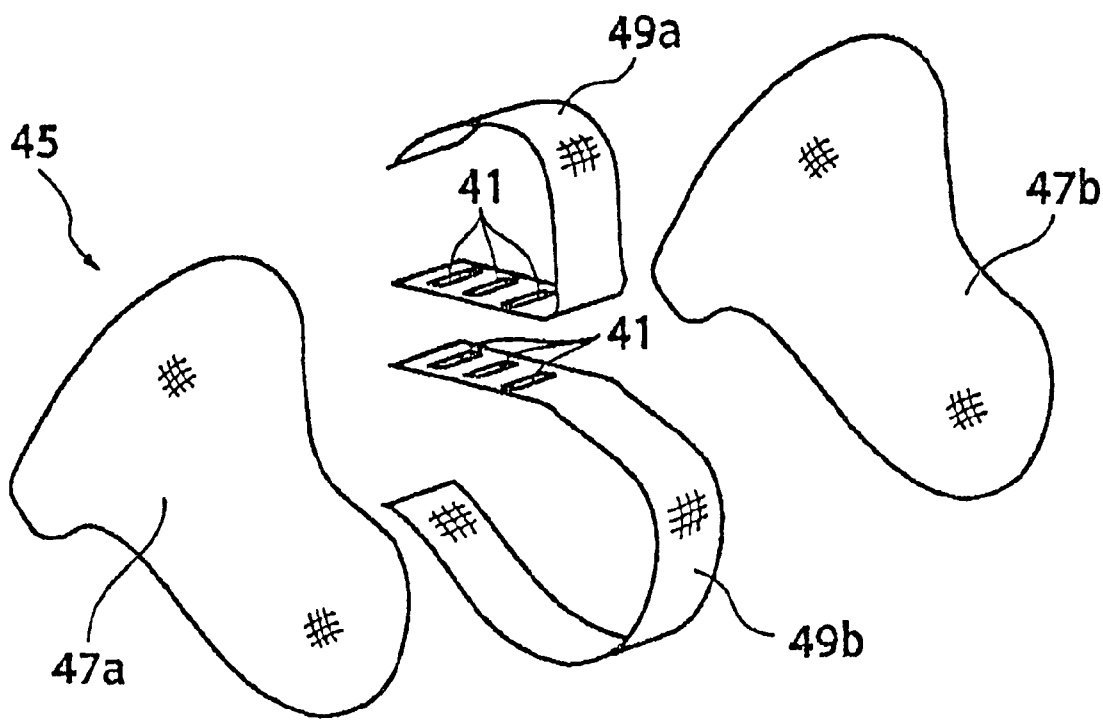
FIG. 11 is a view showing an airbag according to an example of the present invention.

FIG. 11 discloses a further embodiment of an airbag according to the present invention. This example is an airbag made by connecting four pieces of panels. FIG. 11 is an exploded perspective view showing an airbag 45 made by connecting four pieces of panels. The airbag 45 comprises side panels 47a, 47b which are each formed in a guitar-like shape, and upper and lower panels 49a, 49b which are each bent into a U-like shape. A plurality of slit-like openings 41 are formed in portions of the upper and lower panels 49a, 49b to be bonded together. These openings 41 allow the communication of gas.

Figure 12:
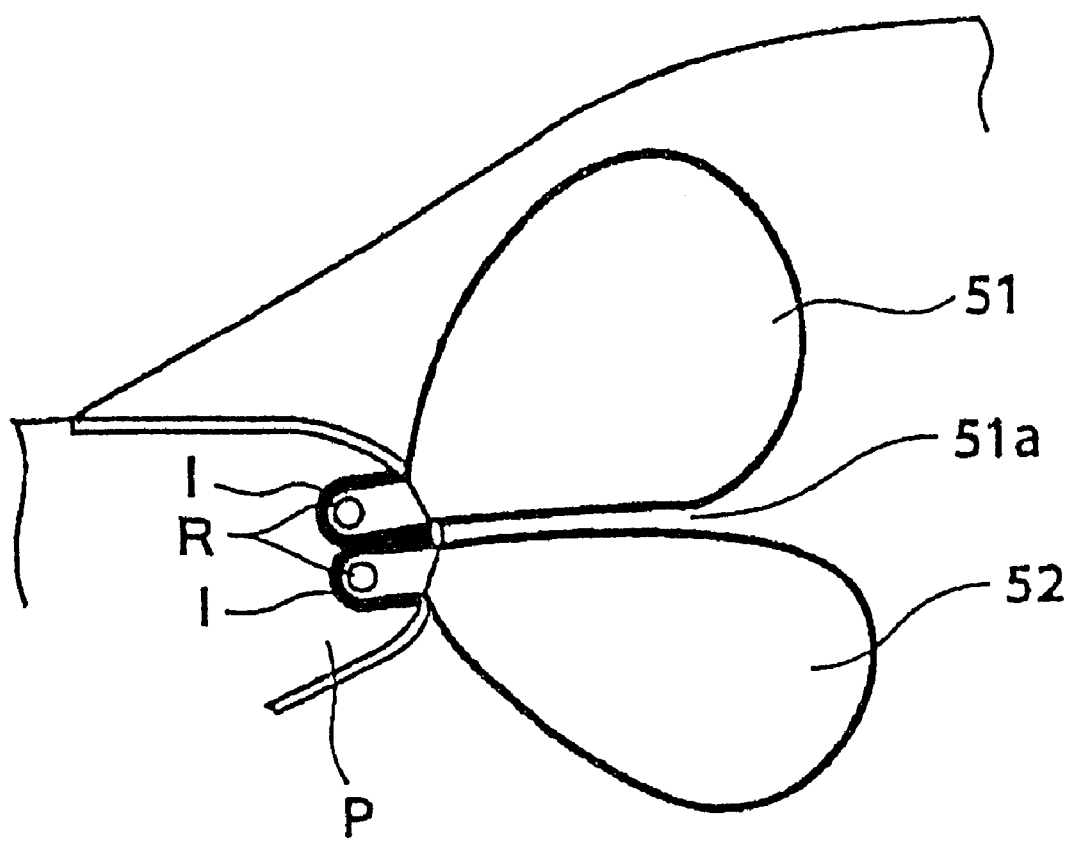
FIG. 12 is a view showing an airbag according to an example of the present invention.

FIG. 12 discloses yet another embodiment of the present invention. This example is an example employing two airbags. In FIG. 12, two airbags 51, 52 are shown. Two inflators I are provided for the airbags 51, 52, respectively. The front faces of the airbags 51, 52 cooperate to form a dent 51a therebetween.

Figure 13:
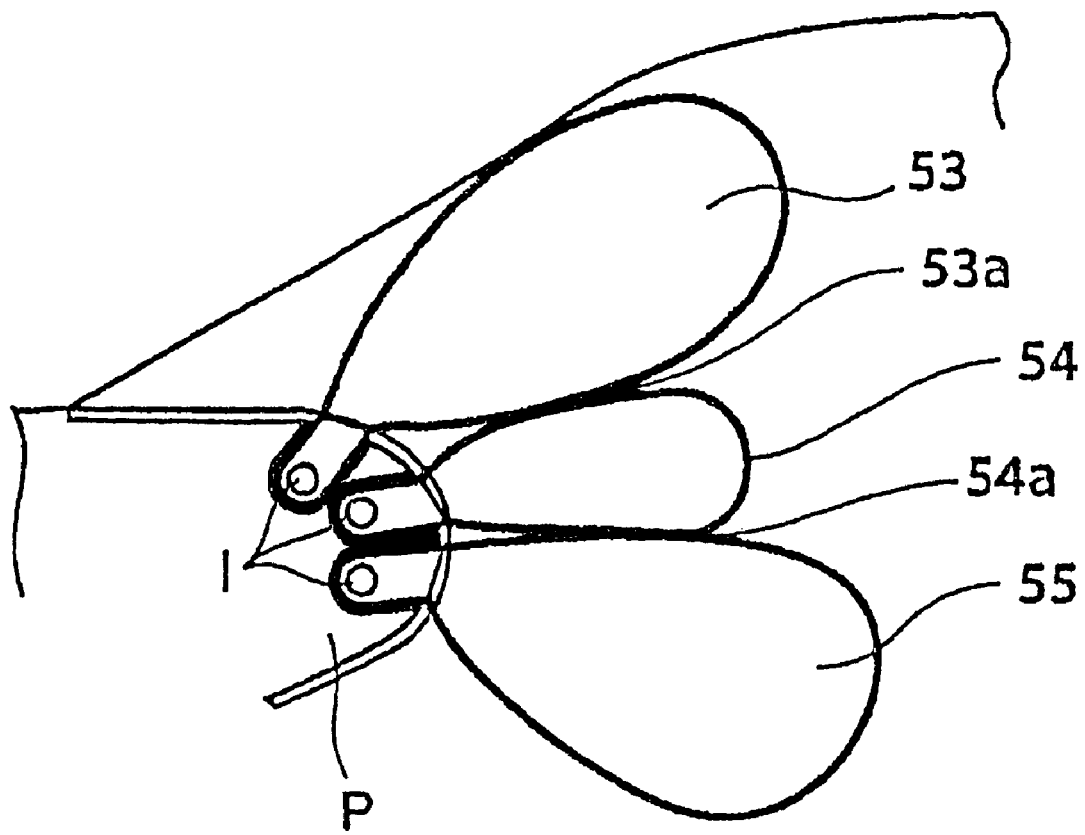
FIG. 13 is a view showing an airbag according to an example of the present invention.

FIG. 13 discloses another embodiment of an airbag according to the present invention. This example is an example employing three airbags. As shown in FIG. 13, three airbags 53, 54, 55 are shown. Three inflators I are provided for the airbags 53, 54, 55, respectively. The front faces of the airbags 53, 54, 55 cooperate to form dents 53a, 54a between the airbags 53, 54 and between the airbags 54, 55.

Figure 14A:
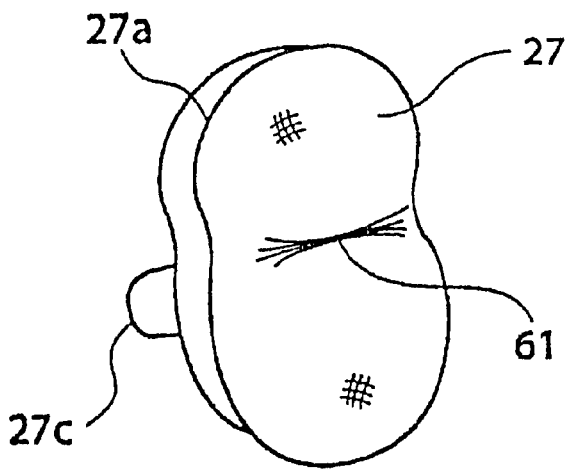
FIGS. 14(A) is a perspective view of an airbag according to an example of the present invention.
Figure 14B:
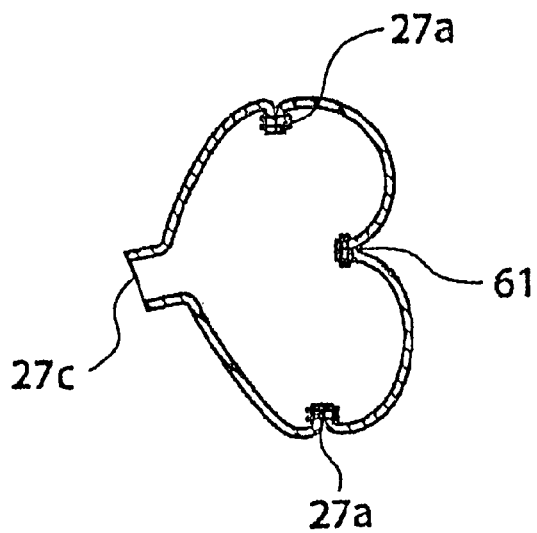
FIG. 14(B) is a sectional side view of the airbag of FIG. 14(A).

FIGS. 14(A), 14(B) are views for explaining another alternative embodiment of an airbag according to the present invention. FIG. 14(A) is a perspective view of an airbag of this example, and FIG. 14(B) is a sectional side view of the airbag. This example is a conventional airbag, but, of which a part is gathered by sewing.

As shown in FIGS. 14(A), 14(B), a conventional airbag 27, originally having no dent portion, of which a part is gathered by sewing is shown. A sewn portion 27a is formed around the periphery of the airbag 27. A gathered portion 61 is formed to horizontally extend at a portion about the center of the front face of the airbag 27. This gathered portion 61 forms a dent. Since this example can use a conventional airbag, the manufacturing is easy.

Figure 15:
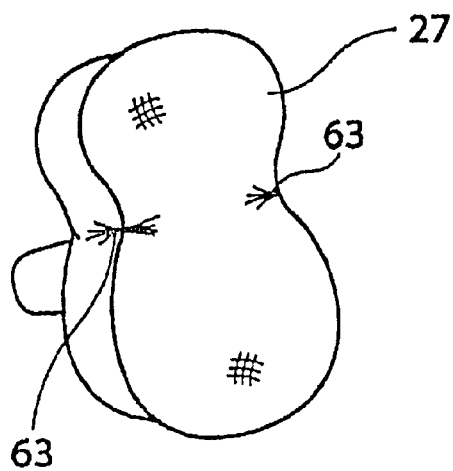
FIG. 15 is a view showing an airbag according to an example of the present invention.

FIG. 15 is a view for explaining yet another one of the examples according to the present invention. This example is another example in which a conventional airbag is used and parts thereof are gathered by sewing. In FIG. 15, a conventional airbag 27, originally having no dent portion, of which parts are gathered by sewing is shown. Two gathered portions 63 are formed at side portions of the front face of the airbag 27. These gathered portions 63 form a dent in a front face of the airbag 27.

Figure 16:
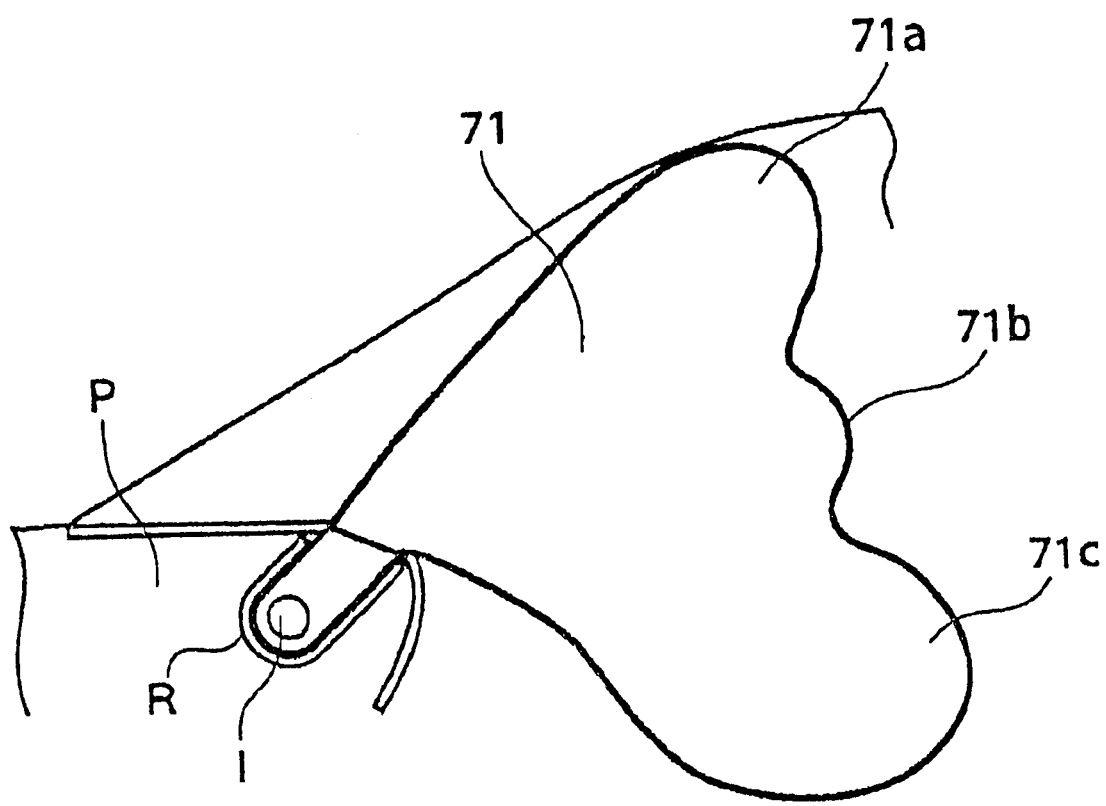
FIG. 16 is a view showing an airbag according to an example of the present invention.

FIG. 16 is a view for explaining still another one of the examples according to the present invention. This example is an airbag having three projecting portions.

In FIG. 16, an airbag 71 having three projecting portions 71a, 71b, 71c is shown. Any one of the methods of making the airbags of the aforementioned examples can be employed as the method of making the airbag 71. The number of projecting portions may be changed to three. The airbag includes a second indentation in the upper portion of the airbag between the upper two projections 71a, 71b.

Though the airbag device according to the embodiment of the present invention has been described with reference to FIGS. 1 through 16, the present invention is not limited thereto. Various modifications may be made as described in the following.

Figure 17:
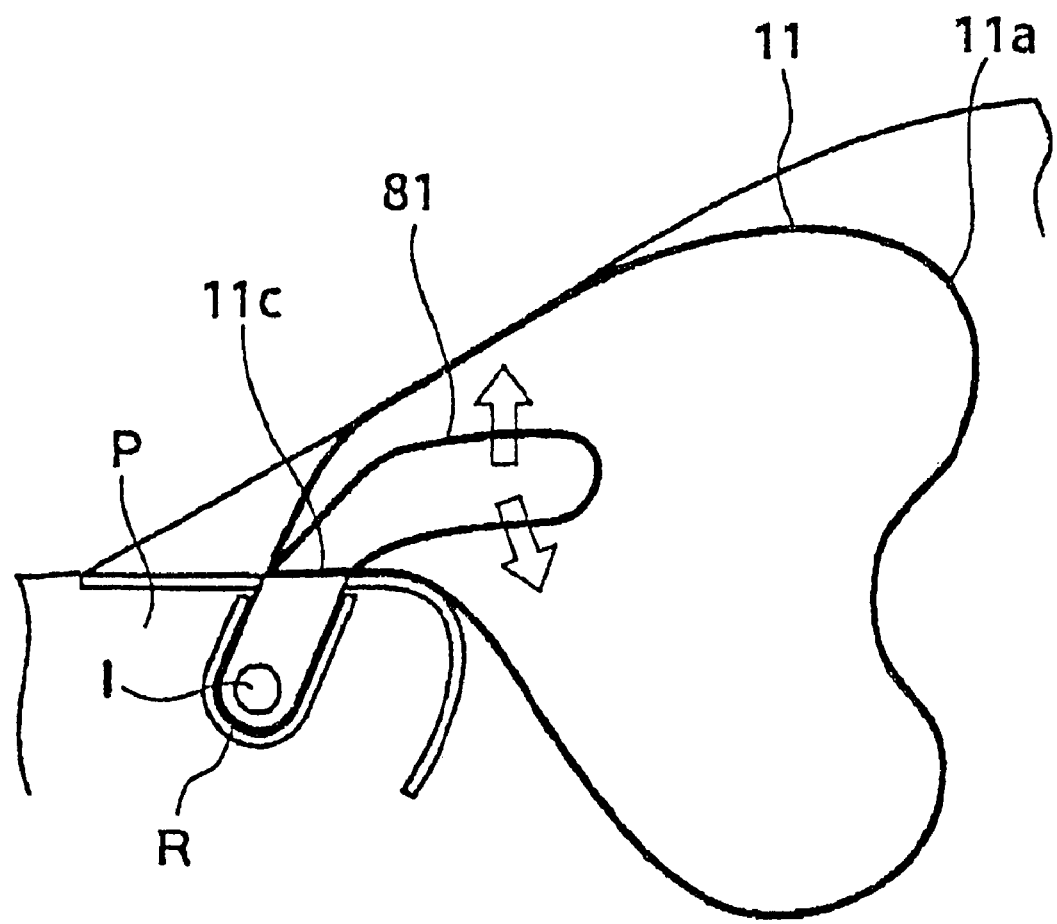
FIG. 17 is a view showing an airbag having a gas flow defusing function.

A gas flow defusing function may be added to the airbag. FIG. 17 is a view showing an airbag having a gas flow defusing function. A fabric defuser 81 as an example of a device for the gas flow defusing function is arranged inside of the airbag 11. The defuser 81 is formed in an envelope shape and has an open end at the left side in the drawing which is connected to a space of an inflator I. The defuser 81 has holes or meshes formed at positions indicated by arrows in order to introduce spouted gas in upward and downward directions. This stabilizes the configuration of the airbag and restricts the deploying direction, thereby speeding up the deployment of the airbag.

Figure 18:
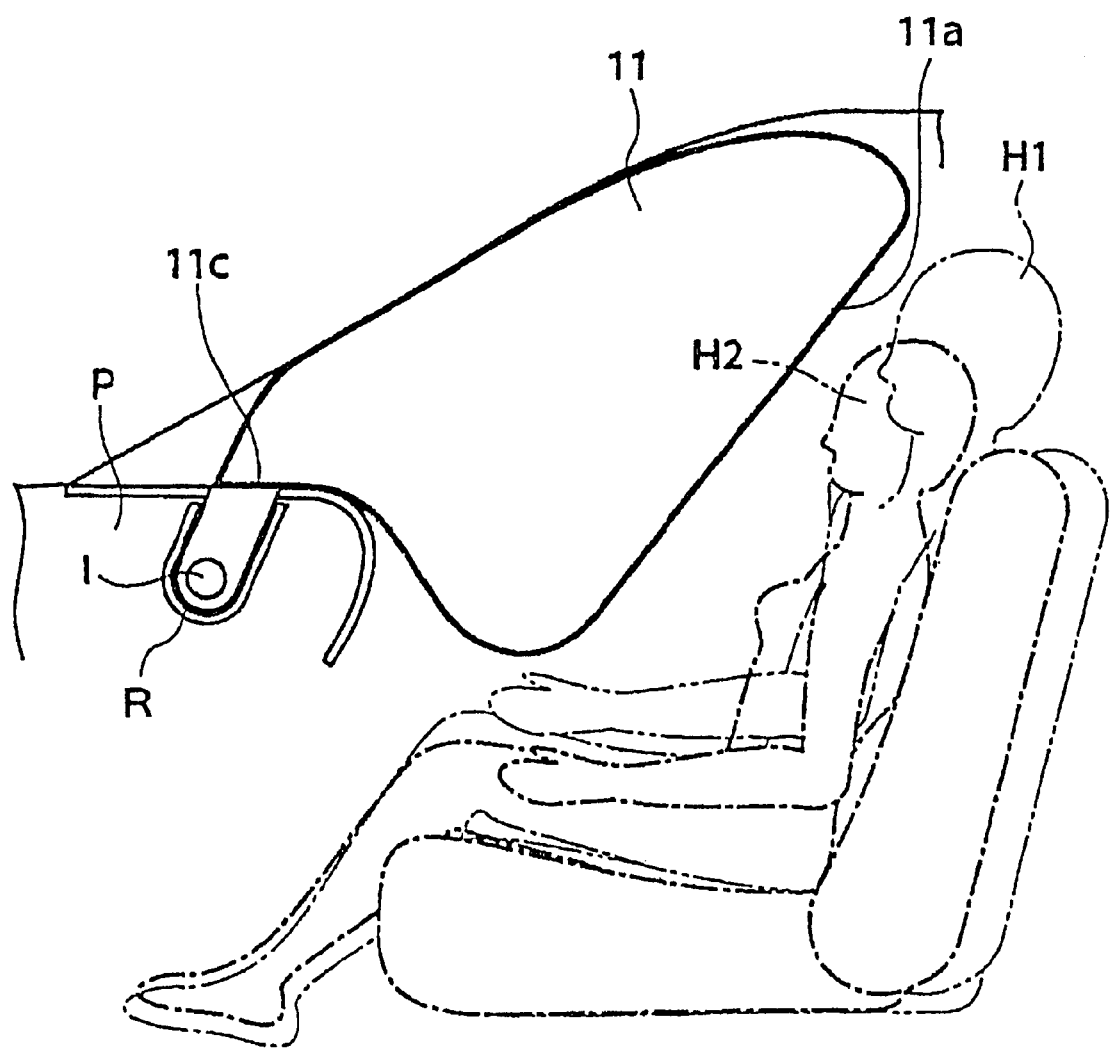
FIG. 18 is a view showing an airbag in which the lower projection is eliminated.

Furthermore, the present invention can be achieved by an airbag in which the projection is eliminated. For example, FIG. 18 is a view showing a further embodiment of the airbag in which the lower projection is eliminated. The airbag 11 shown in FIG. 18 does not have the lower projection and thus does not have the dent. However, the contact surface 11a of the airbag 11 to the occupant also overhangs toward the occupant to have an angle between 0° and 45° (preferably, between 15° and 25°) relative to the cervical vertebrae axis AX of the occupant (see FIG. 2(B)). That is, a point of intersection between a line FF formed by the aforementioned contact surface 11a and the cervical vertebrae axis AX of the occupant is positioned above the head of the occupant and the angle θ formed therebetween is from 0° to 45° (preferably, from 15° to 25°). According to this configuration, the functions according to the claims can be obtained, the volume of the airbag can be reduced, and the output of the inflator can be also reduced, thus allowing the miniaturization of the airbag and the inflator.

As apparent from the above description, the present invention provides an airbag device of which an airbag has an improved configuration accomplishing more effective protection of an occupant.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

We claim:

1. An airbag device for protecting an occupant of a vehicle having an instrument panel comprising:

an airbag including a middle panel having a front face with upper and lower portions, and being configured to be housed in an upper portion of the instrument panel, the airbag being adapted to be inflated and deployed toward the front of the occupant in the case of an emergency;

wherein the middle panel is connected between a pair of side panels; and wherein each of the panels include adjacent cutout portions so that the connected panels form an indentation positioned to maintain the airbag in the shape of a heart when the airbag is inflated;

wherein an area of the front face including the indentation is greater than an area of the upper portion.

2. The airbag device of claim 1, wherein the indentation is formed in the shape of a valley in the airbag.

3. An airbag device for protecting an occupant of a vehicle having an instrument panel comprising:

an airbag configured to be housed in an upper portion of the instrument panel, the airbag including a front face for contacting the occupant when the airbag is inflated or deployed in the event of emergency;

wherein the front face of the air bag includes an upper portion and a lower portion and a cutout portion formed between the upper and lower portion so that when the front face is connected between a pair of side panels and the airbag is deployed an indentation is formed in the front face; and wherein the upper portion includes a contact surface that is configured so that when the airbag is deployed in the event of emergency the contact surface inclines toward the occupant as the contact surface extends upwards away from the lower portion.

4. An airbag device for protecting an occupant of a vehicle comprising:

an airbag adapted to be housed in an upper portion of an instrument panel, the airbag including a front face that contacts the occupant when the airbag is inflated or deployed in the event of emergency;

wherein the front face includes an upper portion, a lower portion, and a cutout portion formed between the upper and lower portion so that when the front face is connected between a pair of side panels and the airbag is deployed an indentation is formed between the upper portion and the lower portion, the front face having a surface inclined toward the occupant, the inclined surface extending from a bottom of the indentation towards the upper portion of the front face.

* * * * *